Nov. 5, 1929.  H. P. HOLLNAGEL  1,734,904
APPARATUS FOR SHAPING SILICA
Filed June 23, 1927

Inventor,
Herbert P. Hollnagel,
by
Attorney.

Patented Nov. 5, 1929

1,734,904

UNITED STATES PATENT OFFICE

HERBERT P. HOLLNAGEL, OF SWAMPSCOTT, MASSACHUSETTS, ASSIGNOR TO GENERAL ELECTRIC COMPANY, A CORPORATION OF NEW YORK

APPARATUS FOR SHAPING SILICA

Application filed June 23, 1927. Serial No. 200,999.

The present invention relates to the manufacture of hollow ware and other shaped articles from silica and it is the object of my invention to provide a process whereby silica may be formed in the open air into articles of desired configuration by a process which does not require the employment of expensive molds or furnaces for fusing silica in such manufacture.

In the manufacture of utensils, such as are used in the chemical industry, or in the manufacture of insulators of large size, such as are used in the electrical industry, silica or quartz has been subjected heretofore to a fusion temperature of about 1750 to 1800° C. The fused material has been blown, drawn and moulded into various forms by processes which in some respects resemble the processes used in the glass industry but which are rendered difficult by the high viscosity and other characteristics of silica.

In accordance with my present invention silica is worked at a temperature materially below its melting point, say in the neighborhood of 1400° C. by methods which more nearly resemble the shaping or spinning of metals by causing the unfused metal to flow over a mold by the application of highly localized pressure with a tool, usually while the mold is being revolved by means of a mechanism similar to a lathe. I have discovered that silica under the influence of pressure may be caused to flow at a temperature so far below its fusing point that the fabrication of silica ware may be carried out by such a "spinning process".

Figure 1:
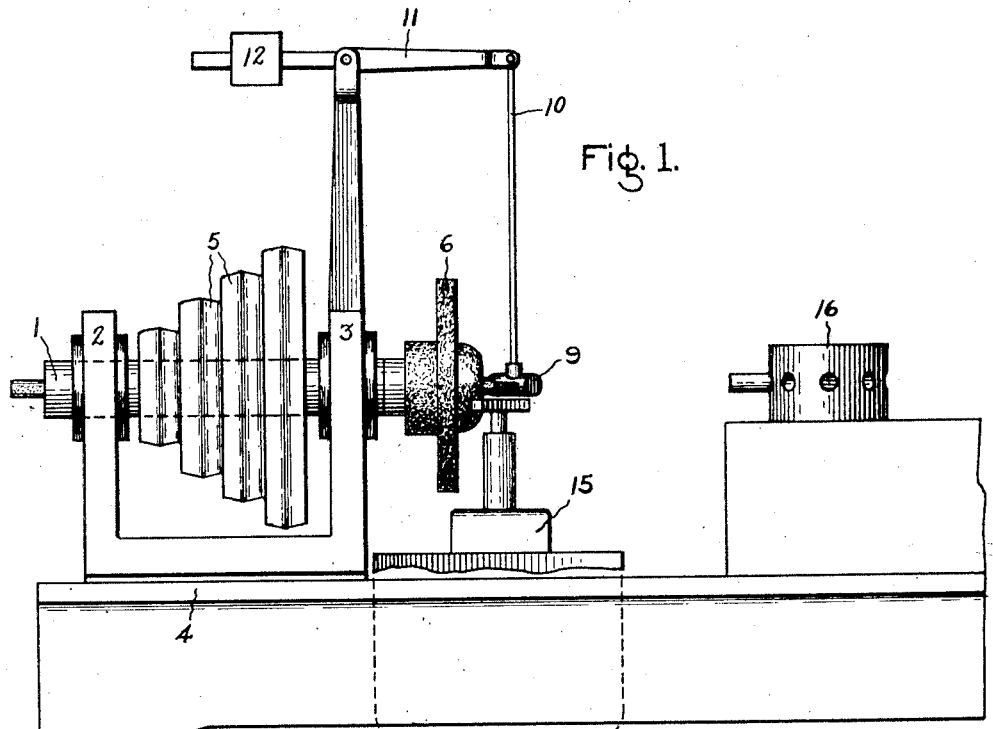
Figure 2:
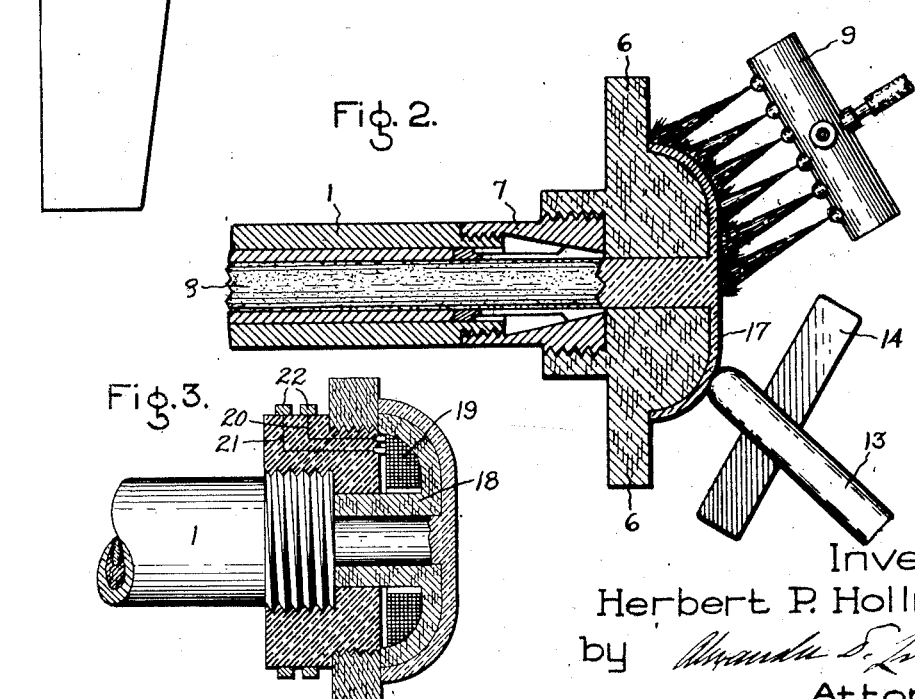
Figure 3:
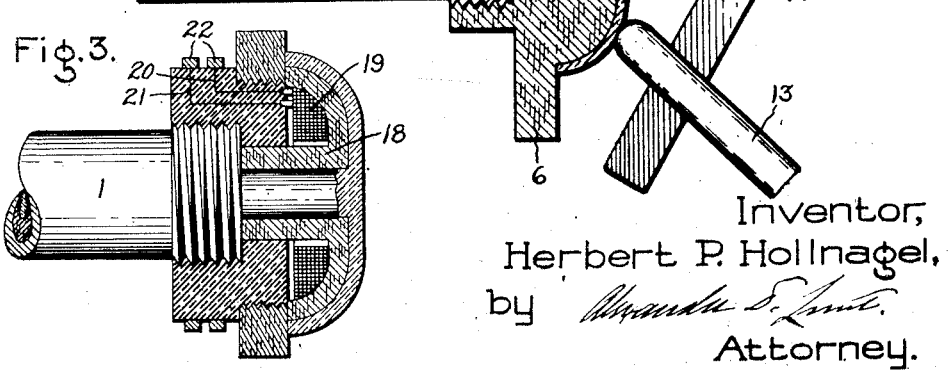

My invention is illustrated somewhat diagrammatically in the accompanying drawing in which Fig. 1 is a side elevation of a mechanism for carrying out the process; Fig. 2 is a longitudinal section through the mandrel or mold upon which the hollow ware is formed and also shows the relation of the external forming tool and the heater to the mandrel, and Fig. 3 is a longitudinal section of a modified mandrel arranged to be electrically heated.

Referring to the drawing, the apparatus there shown for carrying out the present process comprises a spindle 1 mounted on the bearings 2, 3, which are affixed to a base 4, the spindle being driven by any suitable means such as a belt engaging with one of the pulley wheels 5. Mounted upon one end of the spindle 1, which is hollow, is a mandrel or form 6 consisting of suitable refractory material such as graphite or of a refractory metal. A mechanism 7 for connecting the mandrel 6 with the hollow spindle 1 is shown in section in Fig. 2.

In order to carry out the spinning process a slug 8 of silica is introduced into contact with the mandrel, for example, by inserting the silica 8 into the hollow spindle with one end protruding beyond the mandrel 6. The protruding end of the silica is heated to the required temperature of about 1400 to 1550° C., for example, by means of an oxy-gas burner indicated at 9. The burner with its supply conduit 10 may be supported from a lever 11 provided with a counterpoise weight 12. When the protruding end of the silica slug becomes heated to the plastic state pressure is exerted on the protruding portion of the silica by a forming tool 13, which is supported in any suitable way upon a holder 14 on a pedestal 15. The tool 13 should have suitable refractory characteristics and should exert little or no chemical action upon the silica. Carborundum, or fused alumina, may be used for tool purposes. In some cases the forming tool may be held in a turret 16 which is constructed to hold various kinds of forming tools suitable for carrying out various operations in the spinning process. The forming tool which has a materially smaller surface than the mold or mandrel 6 is moved laterally with respect to the mandrel in such position in respect to the silica that a highly localized pressure is exerted on the silica to cause it to flow or bend so as to conform with the exterior surface configuration of the mold. The rate at which the tool can be advanced depends upon the conditions such as the temperature employed and the shape of the mold, the thickness of the wall of the desired silica article, and the pressure applied to the tool. In some cases the tool 13 may be vibrated by pneumatic or other known devices.

When the silica article 17 has been formed upon the mandrel, the tool and burner are removed and the finished article is cut away from the slug 8 by any suitable means, as for example, by means of a flame impinging at the junction of the slug 8 with article 17 when the slug has been moved to the right so as to protrude from the mandrel 6. As the material softens at the heated region the two parts to be separated are drawn apart.

In Fig. 3 is shown a mandrel 18 provided with an electric resistance heater 19 which is connected by means of the electric conductors 20, 21, to the slip rings 22 upon the shaft 1. By such an electric heater, the spinning of the silica may be facilitated as the mandrel when heated both by the heater 19 and the burner 9, will not chill the silica during the spinning operation.

What I claim as new and desire to secure by Letters Patent of the United States, is:

An apparatus for shaping silica comprising a rotatable mold having a central opening, means for supplying silica through said opening, means for heating said silica to plasticity, and means for flowing the plastic silica over said mold during rotation thereof.

In witness whereof I have hereunto set my hand this 20th day of June, 1927.

HERBERT P. HOLLNAGEL.